US012331522B2

(12) United States Patent
Grigoryants

(10) Patent No.: US 12,331,522 B2
(45) Date of Patent: Jun. 17, 2025

(54) CONCRETE ANCHOR ROD POSITIONING AND SECUREMENT DEVICE AND METHOD

(71) Applicant: Yuri Grigoryants, Glendale, CA (US)

(72) Inventor: Yuri Grigoryants, Glendale, CA (US)

( * ) Notice: Subject to any disclaimer, the term of this patent is extended or adjusted under 35 U.S.C. 154(b) by 0 days.

(21) Appl. No.: 18/605,729

(22) Filed: Mar. 14, 2024

(65) Prior Publication Data

US 2024/0309642 A1 Sep. 19, 2024

Related U.S. Application Data

(60) Provisional application No. 63/451,933, filed on Mar. 14, 2023.

(51) Int. Cl.

| | |
|---|---|
| ***E04C 5/16*** | (2006.01) |
| ***B25C 3/00*** | (2006.01) |
| ***E04B 1/41*** | (2006.01) |
| ***E04C 5/12*** | (2006.01) |
| ***E04G 15/04*** | (2006.01) |
| ***E04G 21/18*** | (2006.01) |

(52) U.S. Cl.
CPC .............. *E04C 5/162* (2013.01); *B25C 3/006* (2013.01); *E04B 1/4121* (2013.01); *E04B 1/4171* (2013.01); *E04C 5/12* (2013.01); *E04C 5/161* (2013.01); *E04G 15/04* (2013.01); *E04G 21/185* (2013.01)

(58) Field of Classification Search
CPC ........ E04B 1/4121; E04B 1/4171; E04C 5/12; E04C 5/161; E04C 5/162; E04G 15/04; E04G 21/185; B25C 1/02; B25C 3/006
USPC .............. 52/700; 227/147, 110, 139; 173/90
See application file for complete search history.

(56) References Cited

U.S. PATENT DOCUMENTS

| | | | | |
|---|---|---|---|---|
| 2,488,279 A * | 11/1949 | Fitzmaurice | B25C 3/006 | 408/72 R |
| 3,157,966 A * | 11/1964 | Sherburne | E04G 15/061 | 249/177 |
| 3,810,339 A * | 5/1974 | Russo | E04F 11/1812 | 52/297 |
| 4,614,070 A * | 9/1986 | Idland | E04H 12/2253 | 52/713 |
| 4,807,843 A * | 2/1989 | Courtois | B28B 23/005 | 249/177 |
| 5,678,952 A * | 10/1997 | Shaw | E01C 11/14 | 404/136 |
| 6,161,360 A * | 12/2000 | Smith | E04C 5/168 | 52/165 |
| 9,788,493 B2 * | 10/2017 | Rosaen | A01G 9/28 | |
| 11,499,307 B2 * | 11/2022 | Spampatti | E04B 1/4121 | |

(Continued)

*Primary Examiner* — Brent W Herring
(74) *Attorney, Agent, or Firm* — Law Office of Craig Bohn; Craig E. Bohn

(57) ABSTRACT

A securement device having a rod receiver attachable to the end of an anchor rod, the securement device having a headless nail slidably extendable from a first position within the device to a second position protruding outwardly from the end of the securement device opposite the rod receiver, and a method of positioning and securing an anchor rod attached to the securement device in a desired location on a concrete form deck within a rebar structure for a concrete formation, so that the headless nails may release from the securement device body when the deck is removed after the concrete sets, leaving an innocuous nail void in the concrete that may serve as a functional attachment recess.

8 Claims, 4 Drawing Sheets

(56) References Cited

U.S. PATENT DOCUMENTS

| | | | | |
|---|---|---|---|---|
| 2007/0120040 | A1* | 5/2007 | Hollon | E04G 21/16 249/205 |
| 2007/0134063 | A1* | 6/2007 | Shaw | E01C 19/504 404/62 |
| 2007/0137136 | A1* | 6/2007 | Hollon | E04G 21/16 52/719 |
| 2011/0041449 | A1* | 2/2011 | Espinosa | E02D 35/00 52/698 |
| 2013/0025234 | A1* | 1/2013 | Lin | E04G 21/185 29/505 |
| 2014/0026515 | A1* | 1/2014 | Espinosa | E04B 1/4121 52/700 |
| 2017/0096810 | A1* | 4/2017 | Shaw | B29C 48/12 |
| 2017/0241129 | A1* | 8/2017 | Mahrenholtz | E04B 1/4121 |
| 2018/0283606 | A1* | 10/2018 | Schramm | F16M 13/027 |
| 2018/0298938 | A1* | 10/2018 | Droste | F16B 37/0857 |
| 2019/0161959 | A1* | 5/2019 | Espinosa | E04B 1/4135 |

* cited by examiner

CONCRETE ANCHOR ROD POSITIONING AND SECUREMENT DEVICE AND METHOD

CROSS-REFERENCE TO RELATED APPLICATIONS

This application claims the benefit of U.S. Provisional Application No. 63/451,933, filed on 14 Mar. 2023, by the present inventor, entitled "Concrete Reinforcement Bar Positioning Device," which is hereby incorporated by reference in their entirety for all allowable purposes, including the incorporation and preservation of any and all rights to patentable subject matter of the inventor, such as features, elements, processes and process steps, and improvements that may supplement or relate to the subject matter described herein.

STATEMENT REGARDING FEDERALLY SPONSORED RESEARCH OR DEVELOPMENT

Not Applicable

BACKGROUND OF THE INVENTION

The present invitation relates to devices for integrating structural elements in concrete structures, and more particularly to a device that aids in the positioning and support of anchor rods during the creation of the concrete structures, and provides an attachment point to the hardened concrete formation for supplemental building components.

The current art of concrete anchor rod securement teaches various manners of positioning and securing anchor rods within a concrete structure. Many devices have been proposed that suspend the anchor rods in space inside the forms, but those require a framing structure adjacent to the desired location. Examples of the current art include the Anchor Mate™ line of products by the Simpson Strong-Tie Company, Inc. (www.strongtie.com), a CHUBBYSMACK™ anchor, sold by Earthbound Corporation (www.chubbysmack.com), and various forms of bolt stands, where a threaded nut is secured to a stamped galvanized sheet of metal that can be secured to the framing structure. Adjustment of the location of more than an inch in any direction required adjustment of the corresponding framing structure. These activities are costly, wasteful of materials, and time-consuming.

It would be an improvement to the field of concrete construction to have a faster, more efficient, more adaptable, and more accurate way to position and secure anchor rods in locations within the open wood forms before those forms are filled with liquid concrete and permanently fixed in a structure. It would also be an improvement to the field of concrete construction to provide an anchor rod support where the nails used to secure the support device easily and removed with the framing decking, leaving no exposed metallic elements that may require subsequent removal, cutting, or grinding.

DESCRIPTION OF THE PREFERRED EMBODIMENT

Figure 1:
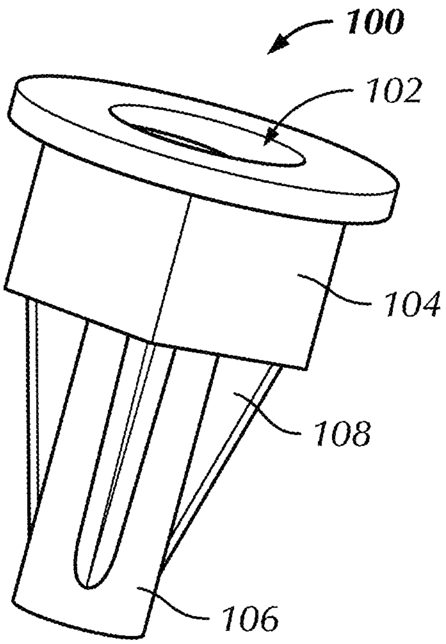
FIG. 1 is a perspective side view of an exemplary anchor rod securement device according to the present invention.
Figure 2:
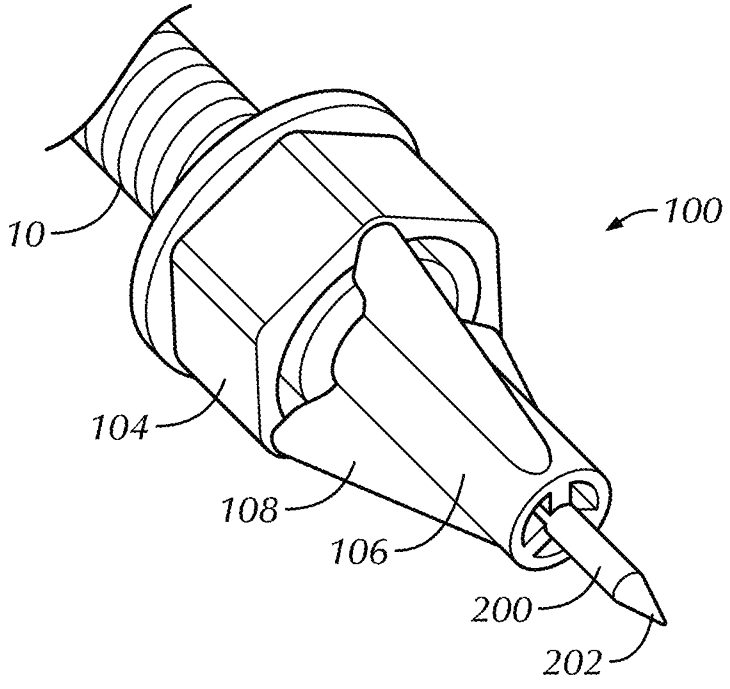
FIG. 2 is a perspective side view of an exemplary anchor rod securement device according to the present invention fitted on a threaded anchor rod.

In an exemplary embodiment, an anchor rod may be a rigid rod useful in securing components to a concrete structure. The sides of an exemplary anchor rod may be smooth or have a texture, and work with securement systems that may compatibly, securely grab and hold the anchor rod. Known in the field of art is an exemplary anchor rod comprised of metal and consisting of threads along the enter length of the rod. Though an exemplary embodiment may show this form of threaded metal rod, and not expressly so other forms of anchor rods, other forms of anchor rods may be employed without parting from the scope duly covered by an allowed claim.

The following reference numbers will be used in this description and the accompanying figures with regard to the corresponding feature or element:

| Work-Pieces and Features | Device Features |
|---|---|
| 10 - anchor rod | 100 - securement device |
| 12 - rod sides | 102 - rod receiver |
| 14 - threads | 104 - wrenching surface |
| 16 - rod insertion end | 106 - nail housing |
| 18 - rod impact end | 108 - housing supports |
| 20 - rebar | 200 - nail |
| 30 - framing deck | 202 - nail point |
| 32 - concrete | 300 - nail impact end |
| 34 - rebar | 302 - nail void |
| | 304 - nail void opening |
| | 306 - rod side engagements |
| | 308 - nail first position |
| | 400 - nail second position |

Referring now to FIGS. 1 through 5, a securement device 100 may have a rod receiver 102 capable of securing a rod insertion end 16 of a rod 10. An exemplary embodiment of a securement device 100 may have a wrenching surface 104 surrounding the rod receiver 102. In an exemplary embodiment, a securement device 100 may have a nail housing 106 extending away from the rod receiver 102 and wrenching surface 104, and structurally supported by multiple housing supports 108 around the exterior of the nail housing 106.

Figure 3:
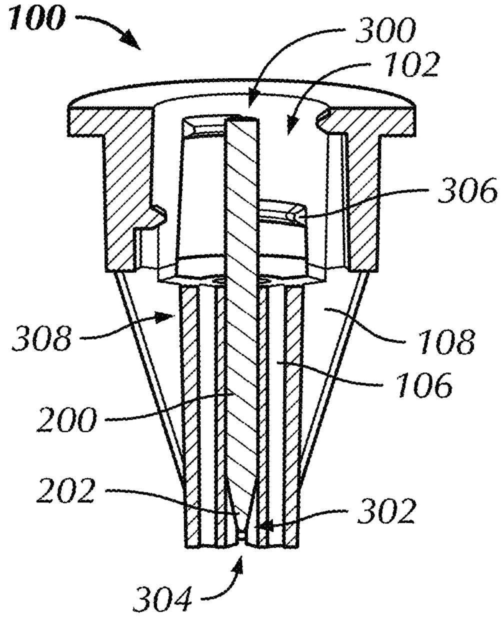
FIG. 3 is a perspective cross-sectional side view of an exemplary anchor rod securement device according to the present invention cut laterally.
Figure 5:
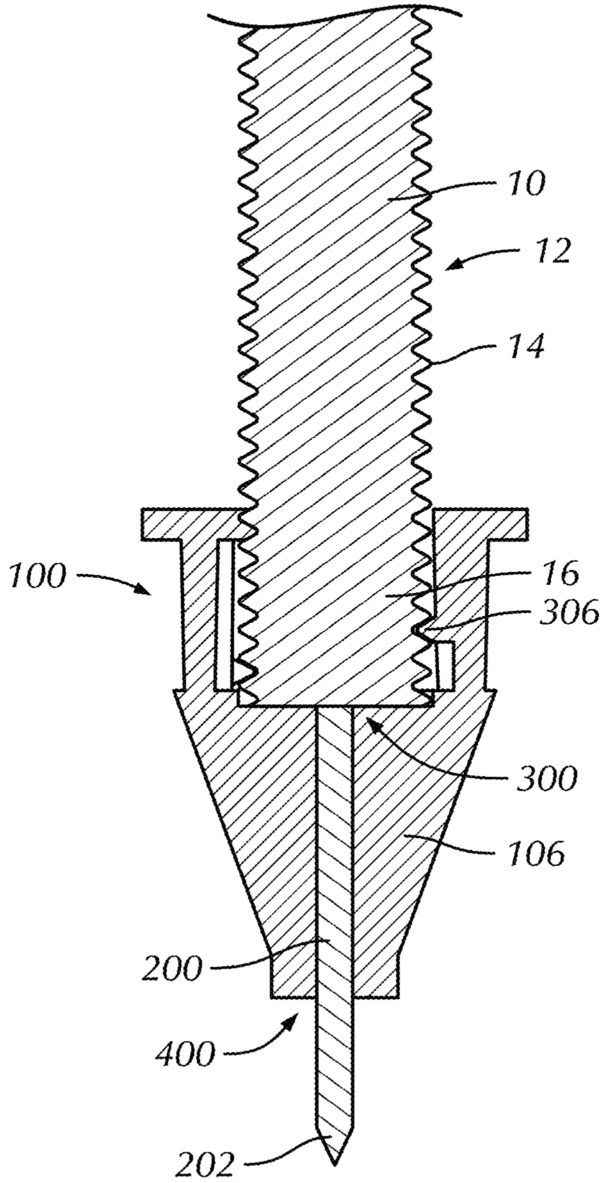
FIG. 5 is a cross-sectional side view of an exemplary anchor rod securement device fitted on a threaded anchor rod, with both cut laterally.
Figure 4:
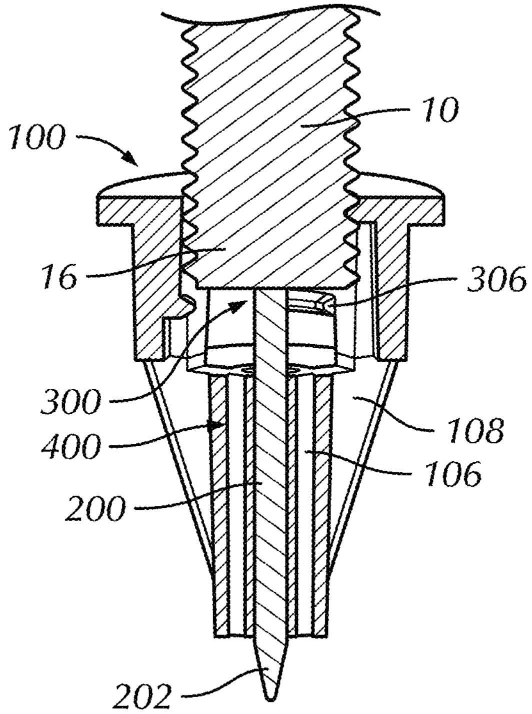
FIG. 4 is a perspective cross-sectional side view of an exemplary anchor rod securement device according to the present invention cut laterally partially fitted on a threaded anchor rod.

Referring now primarily to FIGS. 3 through 5, in an exemplary embodiment, the interior of a rod receiver 102 may have rod side engagements 306 that engage the sides 12 of an anchor rod 10, providing grip and securement to hold the rod 10 within the rod receiver 102. In an exemplary embodiment, a rod side engagement 306 may be a plurality of thread segments formed on the sides of the rod receiver 102 that appropriately may engage the threads 14 of a rod insertion end 16. In an exemplary embodiment, rod insertion end 16 may be slidably inserted into rod receiver 102, and secured by impingement rod side engagements 306. In an alternate exemplary embodiment, rod insertion end 16 may be threadedly screwed into rod receiver 102, and secured by thread segment rod side engagements 306. The wrenching surface 104 may provide a suitable feature at which to apply an appropriately sized wrench to facilitate screwing a threaded anchor rod 10 into a rod receiver 102.

In an exemplary embodiment, insertion of rod insertion end 16 into rod receiver 102 may result in rod insertion end 16 coming in contact with nail 200 at a nail impact end 300. The insertion of rod insertion end 16 into rod receiver 102 may cause rod 10 to push against nail 200, moving nail 200 from a nail first position 308 to a nail second position 400. As rod insertion end 16 becomes fully seated in rod receiver 102, nail 200 may extend fully outwardly from nail void opening 304, while maintaining contact between nail impact end 300 and rod insertion end 16.

In an exemplary embodiment, insertion of rod insertion end 18 into rod receiver 102 may result in rod insertion end 16 coming in contact with nail 200 at a nail impact end 300. The insertion of rod insertion end 18 into rod receiver 102 may cause rod 10 to push against nail 200, moving nail 200 from a nail first position 308 to a nail second position 400. As rod insertion end 16 becomes fully seated in rod receiver 102, nail 200 may extend fully outwardly from nail void opening 304, while maintaining contact between nail impact end 300 and rod insertion end 16.

Figure 6:
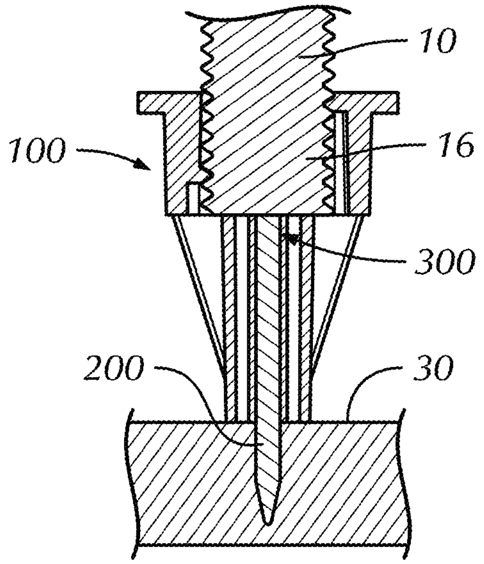
FIG. 6 is a cross-sectional side view of an exemplary anchor rod securement device fitted on a threaded anchor rod, with both cut laterally, secured to a concrete framing deck.
Figure 11:
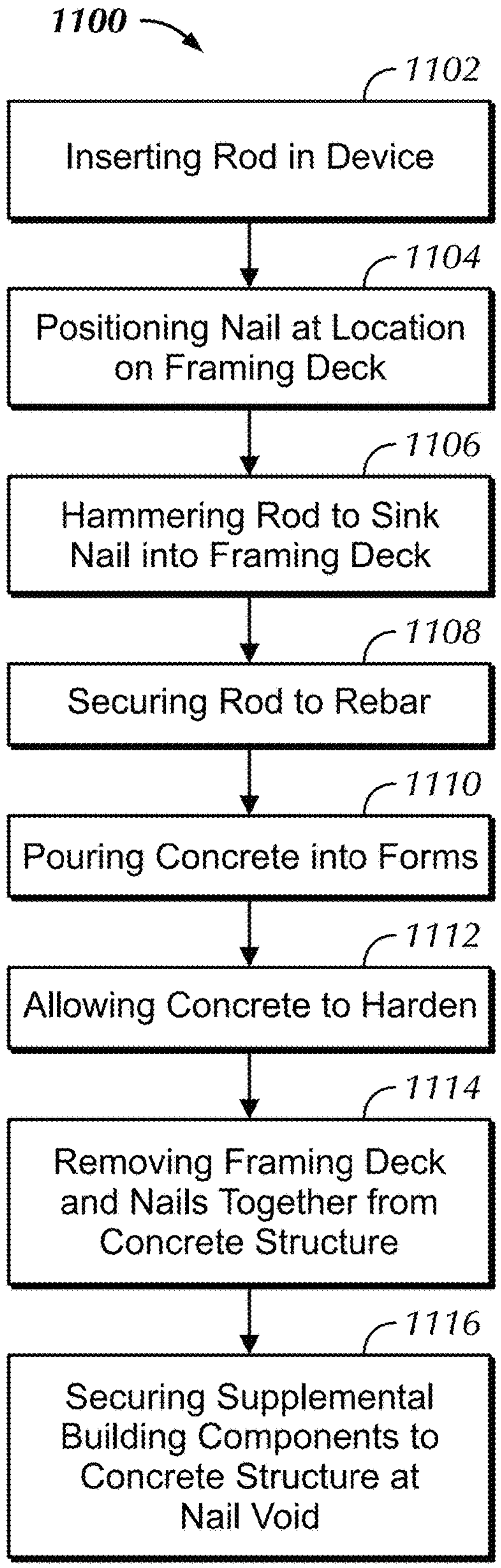
FIG. 11 is a flow diagram for an exemplary process for using an exemplary securement device according to the present invention.

Referring now primarily to FIG. 11, with continued focus on reference to FIGS. 3 through 5, and adding FIG. 6, in an exemplary embodiment, method 1100 of positioning and securing an anchor rod 10 attached to the securement device 100 in a desired location on a concrete framing deck 30 within a rebar 34 structure for a concrete formation 32 may include inserting rod 10 in device 100, as described above. In an exemplary embodiment, by inserting rod insertion end 16 into rod receiver 102 nail 200 moves to a nail second position 400, where a portion of nail 200 may extend outwardly from the nail void 202 at the nail void opening 304. In nail second position 400, nail point 202 extends from the nail void opening 304, and nail impact end 300 is in contact with rod insertion end 16. Nail point 202 provides an accurate reference for accurately positioning 1104 nail 200, and thereby the accompanying device 100 and attached rod 10, at the desired location on framing deck 30. In an exemplary embodiment, by hammering 1106 the rod 10 at rod impact end 18, rod insertion end 16 impacts nail impact end 300, driving nail 200 into the framing deck 30. To preserve the nature of rod 10 at the rod impact end 18, a hammering cap (not shown), suitable for impact with a hammer, may be removably slid over the rod impact end 18, and removed once rod 10 is in place and secure.

Figure 7:
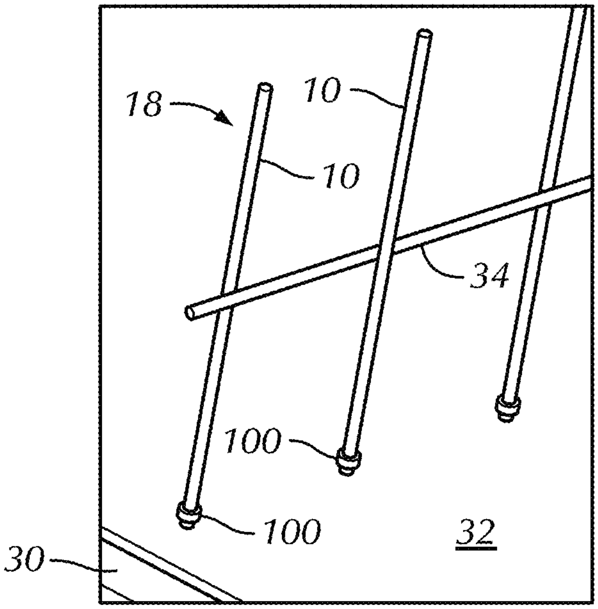
FIG. 7 is a perspective top view of a plurality of exemplary anchor rod securement devices fitted on a threaded anchor rod with an initial amount of wet concrete poured over the framing deck.
Figure 8:
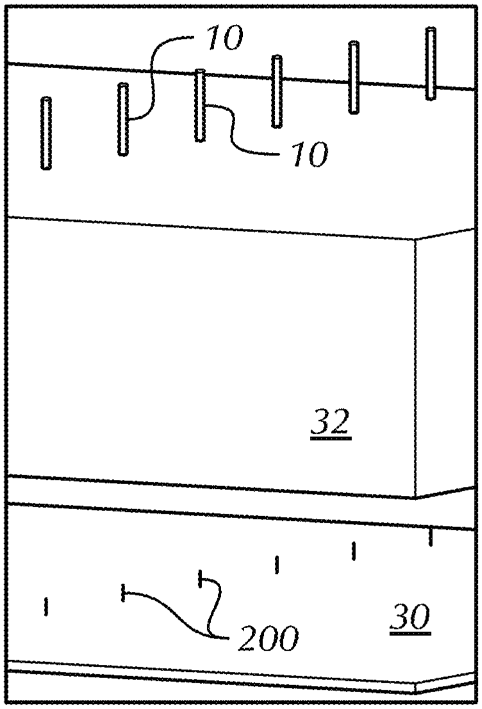
FIG. 8 is a perspective side view of a plurality of exemplary anchor rods fixed in a hardened concrete structure above the removed framing deck, according to the present invention.

Continuing primarily to refer to FIG. 11, and focusing on FIGS. 7 and 8, traditional rebar securing wires may be wrapped around the positioned rod 10, securing 1108 rod 10 to a piece of rebar 34 within the concrete form. Pouring 1110 concrete 32 into the forms fills the forms to a desired level, initially covering the framing deck 30, and then progressively covering the securement devices 100, the anchor rods 10, and the rebar 34. The rod impact ends 18 remain exposed upon completion of pouring 1110 the concrete 32, and time is allocated, allowing 1112 the concrete 32 to harden and form the concrete 32 structure. Once adequately hardened, a process may proceed with removing 1114 the framing deck 30, together with the headless nails 200, from the concrete 32. The nails 200 are secured in the wooden framing deck 30 with a force that overcomes the lesser gripping force a nail housing 106 of a securement device 100 may have on a nail 200. Since a portion of nail 200 is sunk into the framing deck 30, removal of the framing deck 30 pulls on the nails 200, and nails 200 slide from the nail housing 106, remaining with the framing deck 30.

Figure 9:
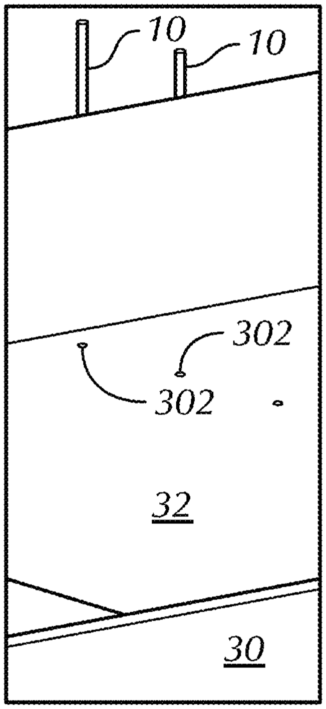
FIG. 9 is a perspective bottom view of a plurality of exemplary anchor rods fixed in a hardened concrete structure above the removed framing deck, according to the present invention.
Figure 10:
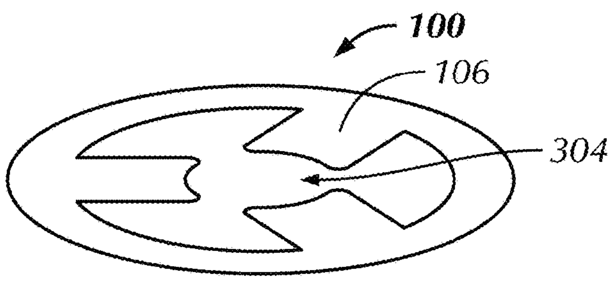
FIG. 10 is an angled bottom view of an exemplary securement device embedded in hardened concrete after the removal of the framing deck.

Continuing primarily to refer to FIG. 11, and focusing on FIGS. 9 and 10, removal of nail 200 from the nail housing 106 of the securement device 100 leaves the nail void opening 304 visible in the concrete 32. Removing the nail from the securement device 100 leaves an innocuous nail void 302 in the concrete that does not have any exposed rustable component that would have to be cut, ground, or covered to prevent premature deterioration of the concrete. The nail void 302 may serve as a functional attachment point. Various forms of supplemental building components may be anchored through the nail void opening 304 into nail void 302, and held securely to the concrete 32 by the securement device 100 captured in the concrete 32. The strength of the securement device 100 in the concrete 100 readily supports securing 1116 supplemental elements to the concrete 32 structure at the nail void 302. Supplemental building components may include signs, plumbing pipes, electrical conduits, HVAC ductwork, security equipment, and fire suppression systems, to name a few.

The combinations of elements that may comprise valid claims may include a securement device, comprising a rod receiver sized to receive an anchor rod, a nail housing having a nail void extending through the length of the nail housing, connected to the rod receiver at an interface between the rod receiver and the nail void, and extending to a nail void opening distal the rod receiver, and the nail void sized to slidably accommodate a headless nail. Additional features may include the nail void capable of receiving an anchor to support attachment of a supplemental building component, and the headless nail slidably secured within the nail void of the nail housing. Additionally or alternatively, the securement device may include the headless nail having a first position characterized by the headless nail contained within the nail void, the headless nail having a nail point and a nail second position characterized by the nail point protruding outwardly from the nail void opening, the headless nail having a nail impact end positioned at the interface between the rod receiver and the nail void in the nail second position.

These combinations may also selectively include a rod side engagement within the rod receiver configured to engage and secure a side of an anchor rod, the rod side engagement comprising a thread segment protrusion from the side wall of the rod receiver, a wrenching surface configured to facilitate insertion of a threaded rod into the rod receiver.

The combinations of elements that may comprise valid claims for a method for positioning and securing an anchor rod in structural concrete that may use the aforementioned device may include inserting an anchor rod into a securement device, the securement device comprising a rod receiver sized to receive an anchor rod, a nail housing having a nail void extending through the length of the nail housing, connected to the rod receiver at an interface between the rod receiver and the nail void, and extending to a nail void opening distal the rod receiver, the nail void sized to slidably accommodate a headless nail, the headless nail slidably secured within the nail void of the nail housing, the headless nail having a nail point, a nail second position characterized by the nail point protruding outwardly from the nail void opening, and a nail impact end positioned at the interface between the rod receiver and the nail void in the nail second position to contact the inserted anchor rod, positioning the nail point at a desired location on a framing deck within a concrete form, hammering the rod to sink the nail into the framing deck at the desired location, pouring the concrete into the concrete form, allowing the concrete to harden to form a concrete structure, and removing the framing deck and nails from the concrete structure together. Additionally, a method could further include securing supplemental building components to the concrete structure with an anchor secured in the nail void.

The foregoing disclosure and description of the invention are illustrative and explanatory thereof. The examples contained in this specification are merely possible implementations of the current device, and alternatives to the particular features and elements may be changed without departing from the spirit of the invention. The present invention should only be limited by the following claims and their legal equivalents since the provided exemplary embodiments are only examples of how the invention may be employed and are not exhaustive.

I claim:

1. A securement device, comprising:

a rod receiver sized to receive an anchor rod;

a nail housing having a nail void extending through the length of the nail housing, connected to the rod receiver at an interface between the rod receiver and the nail void, and extending to a nail void opening distal the rod receiver;

a rod side engagement within the rod receiver configured to engage and secure a side of the anchor rod, the rod side engagement comprising a thread segment protrusion protruding from the side wall of the rod receiver;

the nail void sized to slidably accommodate a headless nail, and the headless nail having a nail first position characterized by the headless nail completely contained within the securement device.

2. The securement device of claim 1, further comprising:

the nail void capable of receiving an anchor to support attachment of a supplemental building component.

3. The securement device of claim 1, further comprising:

the headless nail slidably secured within the nail void of the nail housing.

4. The securement device of claim 3, further comprising:

the headless nail having a nail point and a nail second position characterized by the nail point protruding outwardly from the nail void opening.

5. The securement device of claim 4, further comprising:

the headless nail having a nail impact end positioned at the interface between the rod receiver and the nail void in the nail second position.

6. The securement device of claim 1, further comprising:

a wrenching surface configured to facilitate insertion of a threaded rod into the rod receiver.

7. A method for positioning and securing an anchor rod in structural concrete, the method comprising:

inserting an anchor rod into a securement device, the securement device comprising a rod receiver sized to receive the anchor rod, a nail housing having a nail void extending through the length of the nail housing, connected to the rod receiver at an interface between the rod receiver and the nail void, and extending to a nail void opening distal the rod receiver, a rod side engagement within the rod receiver engaging and securing a side of the anchor rod, the rod side engagement comprising a thread segment protrusion protruding from a side wall of the rod receiver, the nail void sized to slidably accommodate a headless nail, the headless nail slidably secured within the nail void of the nail housing, the headless nail having a nail point, a nail second position characterized by the nail point protruding outwardly from the nail void opening, and a nail impact end positioned at the interface between the rod receiver and the nail void in the nail second position to contact the inserted anchor rod;

positioning the nail point at a desired location on a framing deck within a concrete form;

hammering the anchor rod to sink the nail into the framing deck at the desired location;

pouring the concrete into the concrete form;

allowing the concrete to harden to form a concrete structure; and removing the framing deck and nails from the concrete structure together.

8. The method of claim 7, further comprising:

securing supplemental building components to the concrete structure with an anchor secured in the nail void.

* * * * *